S. G. Dugdale.
Clothes Sprinkler.
No. 97,369.        Patented Nov. 30, 1869.
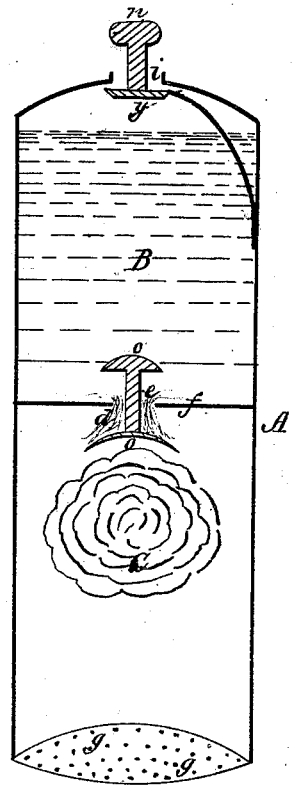
Witnesses:
Wm E Bell
John Calvert
Inventor:
Saml G. Dugdale

United States Patent Office.

SAMUEL G. DUGDALE, OF RICHMOND, INDIANA.

Letters Patent No. 97,369, dated November 30, 1869.

IMPROVED CLOTHES-SPRINKLER.

The Schedule referred to in these Letters Patent and making part of the same.

Be it known that I, SAMUEL G. DUGDALE, of the city of Richmond, in the county of Wayne, and State of Indiana, have invented a new and useful Apparatus for Sprinkling Clothes; and I do hereby declare that the following is a full, clear, and exact description of the construction and operation of the same, reference being had to the annexed drawings, making a part of this specification, in which is shown a section of said apparatus, cut lengthwise through the middle.

A is a vessel of any suitable size or material, having a partition, $f$, and opening $e$ and valve $d$, working in said opening, and being a fraction less in diameter than the same.

Said valve is provided with top and bottom $o$ $o$, larger than the opening. The top should be moderately heavy, and fit over the hole water-tight.

The upper part of the vessel A is the water-chamber B, having a hole, $i$, for the purpose of filling it with water.

$y$ is a spring-valve, for keeping said hole closed when filled, and by turning this end down in a vessel of water, and pressing the knob $n$, on the bottom of the vessel, the chamber readily fills with water, and can be lifted out without leakage. This valve may be used or not, as most convenient.

The lower end of the vessel A is perforated with holes $g$ $g$, and in said vessel is placed a sponge, C, or its equivalent, for the purpose of holding water, working the valve $d$, and splashing on the holes $g$ $g$, throwing out the water on the goods to be sprinkled.

Operation.

The chamber B being filled with water, this apparatus is ready for use, which is simply done by shaking over the clothes in such a manner that the sponge shall play up and down, and in doing so, strikes the bottom of the valve $d$, forcing it up, allowing the water to escape through the hole $e$ from the chamber B into said sponge, which carries it down, splashing the water through the holes $g$ $g$ in fine drops.

What I claim as my invention, and desire to secure by Letters Patent, is—

The vessel A, water-chamber B, sponge C, or its equivalent, partition $f$, valve $d$, and holes $g$ $g$, when arranged in the manner and for the purpose above set forth.

SAML. G. DUGDALE.

Witnesses:
  WM. E. BELL,
  JOHN CALVERT.